(12) United States Patent
Choi (10) Patent No.: US 11,553,013 B2
(45) Date of Patent: Jan. 10, 2023

(54) CHAT ROOM-BASED FILE SHARING DEVICE AND METHOD

(71) Applicants: DELTA PDS CO., LTD., Seoul (KR); Jae Ho Choi, Seoul (KR)

(72) Inventor: Jae Ho Choi, Seoul (KR)

(73) Assignees: DELTA PDS CO., LTD., Seoul (KR); Jae Ho Choi, Seoul (KR)

( * ) Notice: Subject to any disclaimer, the term of this patent is extended or adjusted under 35 U.S.C. 154(b) by 148 days.

(21) Appl. No.: 16/282,622

(22) Filed: Feb. 22, 2019

(65) Prior Publication Data

US 2020/0228580 A1    Jul. 16, 2020

(30) Foreign Application Priority Data

Jan. 10, 2019   (KR) .................. 10-2019-0003161

(51) Int. Cl.
*H04L 65/401*  (2022.01)
*H04L 12/18*   (2006.01)
*H04L 67/06*   (2022.01)

(52) U.S. Cl.
CPC ...... *H04L 65/4015* (2013.01); *H04L 12/1813* (2013.01); *H04L 67/06* (2013.01)

(58) Field of Classification Search
CPC .. H04L 65/4015; H04L 12/1813; H04L 67/06
See application file for complete search history.

(56) References Cited

U.S. PATENT DOCUMENTS

| | | | | |
|---|---|---|---|---|
| 5,838,916 A | * | 11/1998 | Domenikos | H04L 29/06 709/219 |
| 8,060,529 B2 | * | 11/2011 | Hu | H04L 51/08 707/785 |
| 8,938,669 B1 | * | 1/2015 | Cohen | H04L 65/403 715/255 |

(Continued)

FOREIGN PATENT DOCUMENTS

| | | |
|---|---|---|
| KR | 10-1295209 B1 | 9/2013 |
| KR | 10-2015-0111507 A | 10/2015 |
| KR | 10-2017-0060914 A | 6/2017 |

OTHER PUBLICATIONS

Korean Office Action for related KR Application No. 10-2019-0003161 dated Jun. 16, 2020 from Korean Intellectual Property Office.

*Primary Examiner* — Jonathan A Bui
*Assistant Examiner* — Kidest Mendaye
(74) *Attorney, Agent, or Firm* — Paratus Law Group, PLLC (57) ABSTRACT

A chat room-based file sharing device includes: a memory; and a processor electrically connected to the memory, wherein the processor receives file sharing request information including information about a target shared file and a shared file recipient, creates a file sharing chat room associated with the target shared file, that is specified by the file sharing request information, and, when the file sharing chat room is rendered on a terminal of the shared file recipient, provides a file object corresponding to the target shared file (Continued)

through the file sharing chat room, wherein the file sharer and the shared file recipient share the target shared file through the file sharing chat room by participating as chat participants in the file sharing chat room.

22 Claims, 7 Drawing Sheets

(56) References Cited

U.S. PATENT DOCUMENTS

| | | | | |
|---|---|---|---|---|
| 2002/0133542 A1* | 9/2002 | Fujii | ............... | H04L 65/1069 709/203 |
| 2004/0024819 A1* | 2/2004 | Sasaki | ............... | H04L 29/06 709/205 |
| 2006/0208066 A1* | 9/2006 | Finn | ............... | H04H 60/74 235/441 |
| 2011/0010635 A1* | 1/2011 | Fox | ............... | G06Q 10/10 715/744 |
| 2013/0198304 A1* | 8/2013 | Jung | ............... | H04L 51/04 709/206 |
| 2013/0227015 A1* | 8/2013 | Mihara | ............... | H04L 67/06 709/204 |
| 2014/0267567 A1* | 9/2014 | Mihara | ............... | H04L 65/403 348/14.08 |
| 2015/0180914 A1* | 6/2015 | Welinder | ............... | G06F 11/2082 715/758 |
| 2016/0224939 A1* | 8/2016 | Chen | ............... | G06Q 10/06311 |
| 2016/0247410 A1* | 8/2016 | Jandard | ............... | G09B 7/02 |
| 2018/0124129 A1* | 5/2018 | Geisler | ............... | H04L 67/306 |
| 2018/0167451 A1* | 6/2018 | Yi | ............... | H04L 65/1069 |
| 2018/0212904 A1* | 7/2018 | Smullen | ............... | H04L 67/322 |
| 2019/0007362 A1* | 1/2019 | Shmunis | ............... | H04L 51/36 |
| 2019/0034656 A1* | 1/2019 | Ow | ............... | H04L 63/0815 |
| 2019/0354395 A1* | 11/2019 | Clark | ............... | G06F 7/00 |

* cited by examiner

CHAT ROOM-BASED FILE SHARING DEVICE AND METHOD

CROSS-REFERENCE TO RELATED APPLICATION

This application claims priority to and the benefit of Korean Patent Application No. 10-2019-0003161 filed on Jan. 10, 2019, which is hereby incorporate by reference in its entirety.

BACKGROUND

The present invention relates to a task processing technology, and more particularly, to a technology that creates a sharing group by selecting file-sharing members for each file and manages and keeps a record of file changes, modifications, etc. while performing a task.

In general, an internet messenger is an application that transmits messages containing text or graphics between users, and may come in the form of a chat room which a plurality of users can join. In an exemplary embodiment, the internet messenger may be a mobile messenger that runs in a mobile environment (for example, on a mobile phone), examples of which include KakaoTalk, Line, WeChat, Facebook Messenger. Moreover, such internet messengers are used for a wider variety of applications in regard to managing and performing tasks.

SUMMARY

The present invention provides a file sharing means and a means of communication between file sharers, that can be used when performing a task by sharing a file associated with the task, while restricting the rights to the file.

The present invention also provides a task management technology that provides a specific file to other users through a chat room, while keeping other users' file access rights under control of the user who provides the file, and continuously follows up on file modifications or task progress through the chat room after the file is provided.

An exemplary embodiment of the present invention provides a chat room-based file sharing device comprising: a memory; and a processor electrically connected to the memory, wherein the processor receives file sharing request information including information about a target shared file and a shared file recipient, creates a file sharing chat room associated with the target shared file, that is specified by the file sharing request information, and, when the file sharing chat room is rendered on a terminal of the shared file recipient, provides a file object corresponding to the target shared file through the file sharing chat room, wherein the file sharer and the shared file recipient share the target shared file through the file sharing chat room by participating as chat participants in the file sharing chat room.

DETAILED DESCRIPTION

Explanation of the present invention is merely embodiments for structural or functional description, so the scope of the present invention should not be construed to be limited to the embodiments explained in the embodiment. That is, since the embodiments may be implemented in several forms, it should also be understood that the scope of the present invention includes equivalents able to realize its technical idea. In addition, it does not mean that a specific embodiment embraces all the purposes or effects suggested in the present invention or embraces only such effects, and therefore, it should be understood that the scope of the present invention is not limited thereto.

Meanwhile, terms used in the following description need to be understood as below.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, numerals, operations, components, parts, or a combination thereof, but do not preclude the presence or addition of one or more other features, numerals, steps, operations, components, parts, or a combination thereof.

Identification symbols (e.g., a, b, c, etc.) of individual steps are used for convenience of description and do not describe a sequence of the steps. The individual steps may be performed in a sequence different from a described sequence unless a specific sequence is clearly described in the context. In other words, the steps may be performed in the described sequence, performed substantially at the same time, or performed in a reverse sequence.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a read only memory (ROM), a random access memory (RAM), a compact disk read only memory (CD-ROM), a magnetic tape, a floppy disc, and an optical data storage device. In addition, the computer-readable recording medium may be distributed in a computer system connected by a network, and store and implement a computer-readable code in a distributed manner.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

Figure 1:
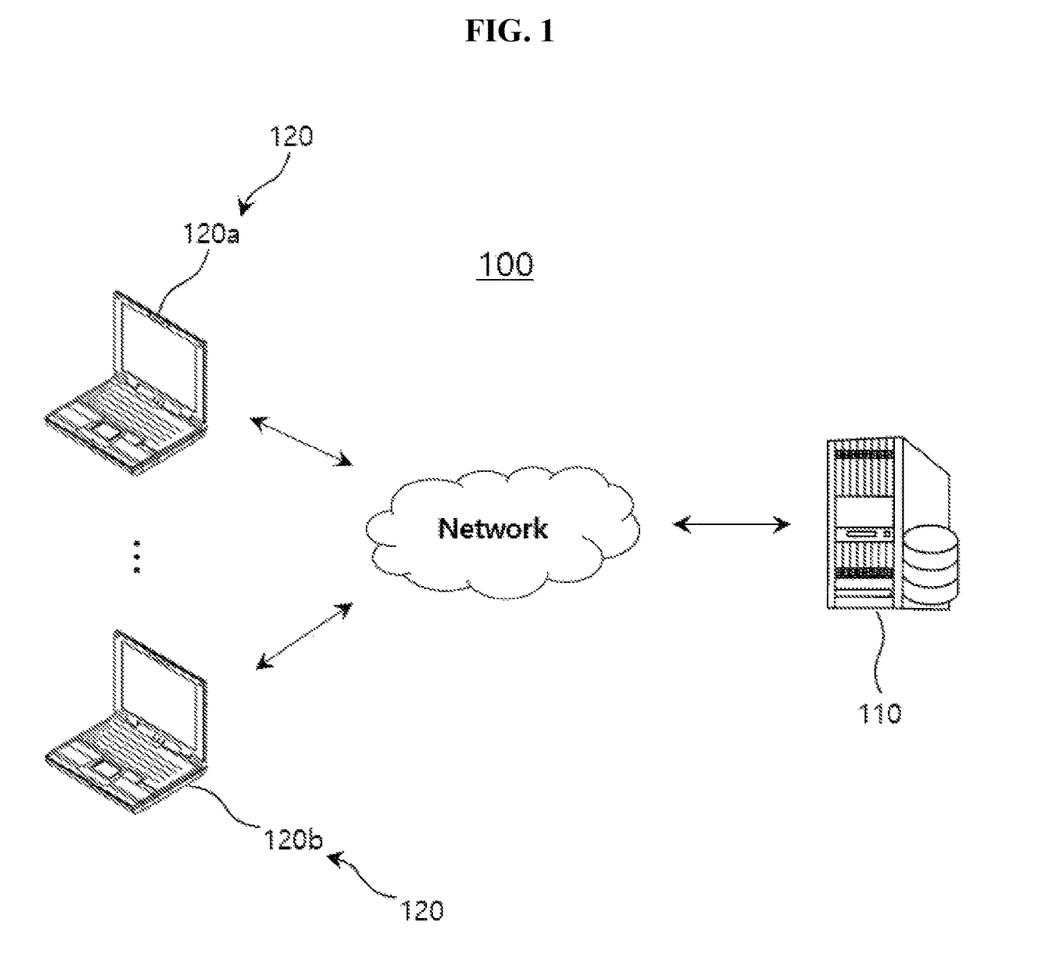
FIG. 1 is a view illustrating a chat room-based file sharing system according to an exemplary embodiment of the present invention.

FIG. 1 is a view illustrating a chat room-based file sharing system 100 according to an exemplary embodiment of the present invention.

Referring to FIG. 1, a chat room-based file sharing system 100 includes a chat room-based file sharing device 110 and one or more user terminals 120. Here, the user terminal 120 includes a file sharer terminal 120a and a shared file recipient terminal 120b with which a file is shared. The file sharer terminal 120a is a terminal of a user who specifies a file to share and a target to share with and shares the file. The target shared file recipient terminal 120b is a terminal of a user with whom the file sharer chooses to share a particular file.

The chat room-based file sharing device 110 is a computing device that can be connected to at least one file sharer terminal 120a and at least one file recipient terminal 120b through a network. In an exemplary embodiment, the chat room-based file sharing device 110 may manage at least one group in which a user associated with the file sharer terminal 120a is included as a member.

In an exemplary embodiment, the chat room-based file sharing device 110 may be connected to the user terminal 120 through a shared folder agent installed on the user terminal 120. Here, the shared folder agent is an agent program, which is software that, once installed on the user terminal 120, allows the user terminal 120 and the chat room-based file sharing device 110 to work in conjunction with each other through a network under approval from the user terminal 120.

The user terminal 120 is a computing device that can be connected to the chat room-based file sharing device 110 through a network—for example, a terminal that comes in the form of a desktop, a laptop, a tablet PC, or a smartphone.

In an exemplary embodiment, at least one between the file sharer terminal 120 and the shared file recipient terminal 120b may be a mobile terminal, and may be connected to the chat room-based file sharing device 110 through cellular communication or WiFi communication. In another exemplary embodiment, at least one between the file sharer terminal 120a and the shared file recipient terminal 120b may be a desktop, and may be connected to the chat room-based file sharing device 110 through the internet.

Here, one or more file sharers and file recipients respectively corresponding to the file sharer terminal 120a or the shared file recipient terminal 120b may be folder sharing participants who participate in a shared folder or file sharing participants who have the right to access a shared file. Here, the file sharer and the shared file recipient may participate in different shared folders. Also, the shared file to which the file sharer has the rights to access and the shared file which the shared file recipient has the right to access do not necessarily have to be the same.

In an exemplary embodiment of the present invention, the file sharer may be a folder participant in a shared folder, and the shared file recipient may not be a folder participant in that folder. Accordingly, the file sharer may temporarily share with the shared file recipient a file in the shared folder to which the shared file recipient has no rights, while restricting the shared file recipient's rights through the chat room-based file sharing device and method according to the exemplary embodiment of the present invention.

Thus, the file sharer may be a user who has rights to a target shared file, whereas the shared file recipient may be a user who have no right to access or read the file. The location of the target shared file may be, but not limited to, a shared folder provided by the chat room-based file sharing device 110. The target shared file may be in a shared folder provided by the chat room-based file sharing device 110 or in a private folder of the file sharer.

Figure 2:
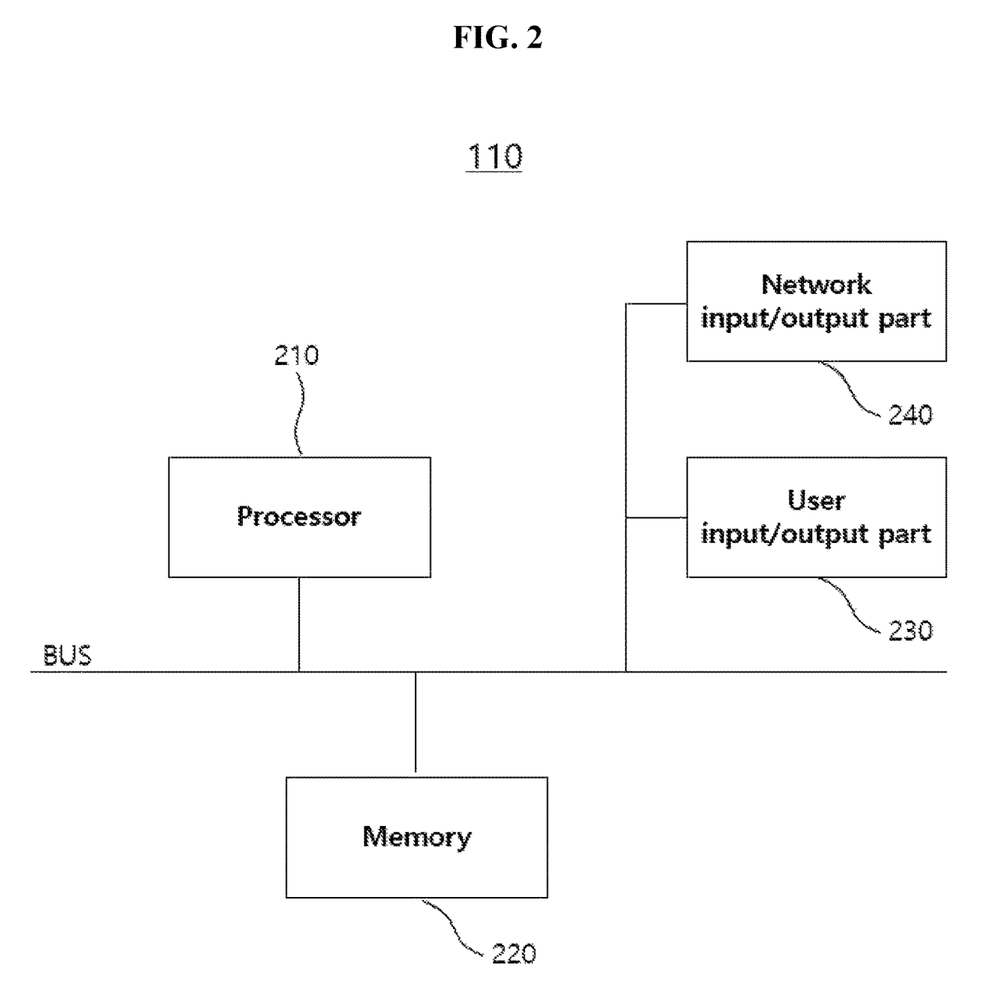
FIG. 2 is a block diagram of a chat room-based file sharing device according to an exemplary embodiment of the present invention.

FIG. 2 is a block diagram of a chat room-based file sharing device 110 according to an exemplary embodiment of the present invention.

Referring to FIG. 2, the chat room-based file sharing device 110 may include a processor 210, a memory 220, a user input/output part 230, and a network input/output part 240.

The processor 210 may execute a chat room-based file sharing procedure according to the exemplary embodiment of the present invention, manage the memory 220 which is read or written in this procedure, and schedule time synchronization between volatile and non-volatile memories in the memory 220.

The processor 210 may control the overall operation of the chat room-based file sharing device 110, and may be electrically connected to the memory 220, user input/output part 230, and network input/output part 240 and control data follow between them. The processor 210 may be implemented as a CPU (Central Processing Unit) of the chat room-based file sharing device 110. More details of the operation of the processor 210 will be described below with reference to FIG. 3.

The memory 220 may include auxiliary storage which is implemented as a non-volatile memory such as SSD (Solid State Disk) or HDD (Hard Disk Drive) and used to store overall data required for the chat room-based file sharing device 110 and primary storage which is implemented as a volatile memory such as RAM (Random Access Memory). That is to say, the memory 220 may be implemented as a volatile or non-volatile memory, and may be connected by a hyperlink if implemented as a non-volatile memory.

The user input/output part 230 includes an environment for receiving user input and an environment for outputting particular information to the user—for example, an input device including an adapter such as a mouse, trackball, touchpad, graphic tablet, scanner, touchscreen, keyboard, or pointing device, and an output device including an adaptor such as a monitor or touchscreen. In an exemplary embodiment, the user input/output part 230 may correspond to a computing device connected via a remote connection, in which case the chat room-based file sharing device 110 may serve as a server.

The network input/output part 240 may include an environment for connecting to the user terminal 120 via a network—for example, an adapter for LAN (Local Area Network) communication.

Figure 3:
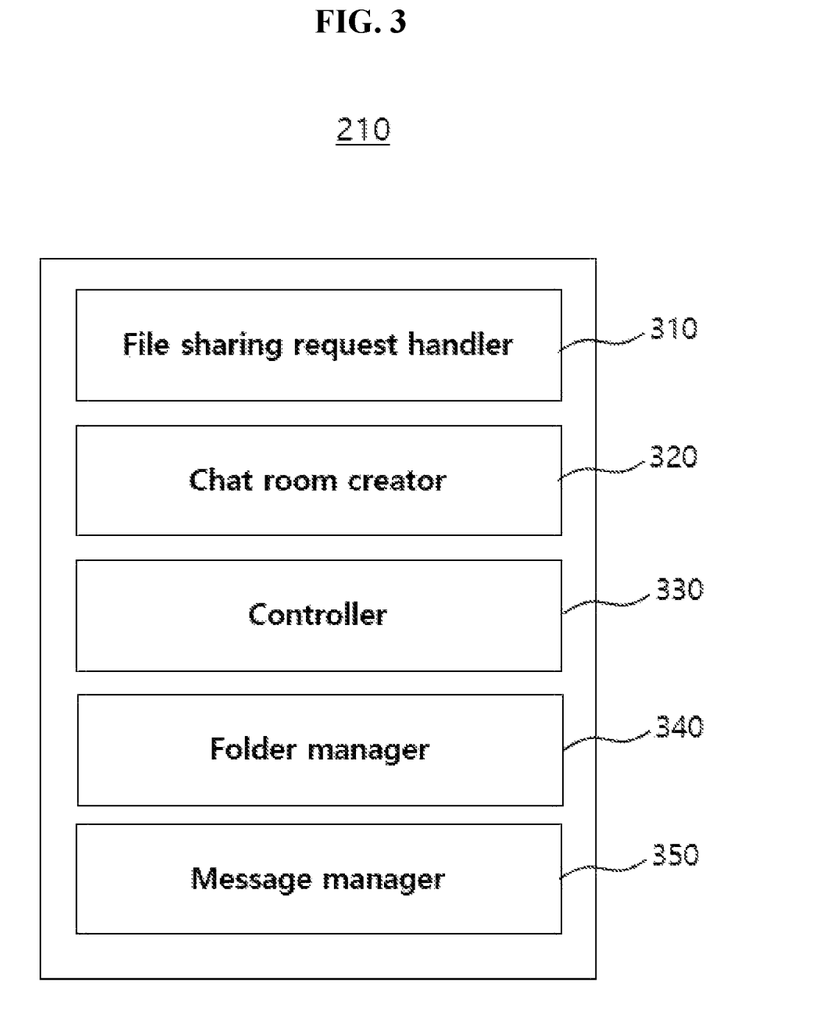
FIG. 3 is a block diagram of a processor in a chat room-based file sharing device according to an exemplary embodiment of the present invention.

FIG. 3 is a block diagram of a processor 210 in a chat room-based file sharing device 110 according to an exemplary embodiment of the present invention.

According to the exemplary embodiment to be explained with reference to FIG. 3, the processor 210 may include a file sharing request handler 310, a chat room creator 320, a controller 330, a folder manager 340, and a message manager 350. However, the processor 210 according to the exemplary embodiment of the present invention does not necessarily include all of the above components, some of these components may be omitted in some embodiments, and the processor 210 may include some or all of the aforementioned components.

The file sharing request handler 310 may receive file sharing request information from the file sharer terminal 120*a*. The file sharing request information includes information about a target shared file, that is specified by the file sharer terminal 120*a*, and information about a shared file recipient. That is, the file sharing request information may include information about which file to share with whom, and may be a signal requesting the creation of a file sharing chat room.

Accordingly, upon receiving file sharing request information from the file sharer terminal 120*a*, the file sharing request handler 310 may extract identification information of the target shared file and identification information of the shared file recipient or file recipient terminal 120*b* from the file sharing request information and provide this information to the chat room creator 320 and the controller 330.

The chat room creator 320 may create a file sharing chat room. Which file this file sharing chat room is associated with and who are the chat participants in the chat room may be specified by the above-explained file sharing request information. The chat room creator 320 may create a file sharing chat room, which is associated with the target shared file, and in which the shared file recipient is participating, based on the information for identifying the target shared file and the shared file recipient that is contained in the file sharing request information and provided by the file sharing request handler 310.

When a file sharing chat room is rendered on the shared file recipient terminal 120*b*, the controller 330 may provide a file object corresponding to the target shared file through the file sharing chat room.

As a file sharing chat room for a particular file is opened, the file sharer and the shared file recipient may share the target shared file through the file sharing chat room by participating as chat participants in the file sharing chat room. The shared file recipient may obtain limited access rights to the target shared file by getting the target shared file through the file sharing chat room, especially even when the shared file recipient had no access rights to the target shared file before. Also, the shared file recipient may share the target shared file with the file sharer.

A method for the controller 330 to provide the target shared file to the shared file recipient terminal 120*b* may be implemented in various exemplary embodiments.

According to an exemplary embodiment, first of all, upon receiving a signal from the shared file recipient terminal 120*b* through the chat room, requesting the provision of the file, the chat room-based file sharing device 110 may send the target shared file to the shared file recipient terminal 120*b*. Also, the file sharing chat room may be provided with an access path to the target shared file as a chat message.

For example, if the shared file recipient clicks on the name of the file sharing chat room displayed on the shared file recipient terminal 120*b*, the controller 330 may recognize this as a signal requesting the provision of the target shared file and provide the target shared file to the shared file recipient terminal 120*b* through the file sharing chat room.

In this case, a method how to render the target shared file on the shared file recipient terminal 120*b* once the target shared file is sent to the shared file recipient terminal 120*b* through the file sharing chat room may be implemented in various exemplary embodiments. Firstly, the target shared file may be provided in the form of a chat message in the file sharing chat room rendered on the shared file recipient terminal 120*b*. Likewise, the access path to the target shared file may be provided in the form of a chat message in the file sharing chat room.

That is, the controller 330 may provide a file object corresponding to the target shared file in the form of a chat message. Once the file sharing chat room is rendered on the shared file recipient terminal 120*b*, the controller 330 may send the file object corresponding to the target shared file through the file sharing chat room as a change message in the file sharing chat room.

Also, once the file sharing chat room is rendered on the shared file recipient terminal 120*b*, the controller 330 may send the access path to the target shared file through the file sharing chat room in the form of a chat message in the file sharing chat room.

In this case, the target shared file may be displayed as a chat message in the chat window of the file sharing chat room, or may be displayed through a window dedicated to the file sharing chat room.

The target shared file provided to the shared file recipient terminal 120*b* through the file sharing chat room may be temporarily stored in the memory 220 in the chat room-based file sharing device 110. Also, the target shared file provided to the shared file recipient terminal 120*b* through the file sharing chat room may be set in such a way as not to be permanently stored in the memory in the shared file recipient terminal 120*b*.

In this case, when the file sharing chat room is ended, for example, the window that displays the target shared file, too, may be ended or disabled.

That is, according to the exemplary embodiment of the present invention, the controller 330 may provide the target shared file to the shared file recipient while having the target shared file shared by a plurality of users but restricting their rights to the file.

The present invention is different from file sharing via email or typical messengers in that the target shared file cannot be temporarily stored so as to restrict the shared file recipient from owning, editing, and deleting the file without control from the file sharer. This difference is meaningful in that it prevents copying and redistribution of the target shared file which needs to be kept secure.

Meanwhile, the target shared file may be shared by other users, except the file sharer and the shared file recipient. Particularly, it can be assumed that the target shared file is in a particular shared folder and other users participate as folder participants in that shared folder. In this instance, the shared file recipient is not included as a folder participant in that shared folder.

In this case, the target shared file may be modified or changed by other users, except the file sharer and the shared file recipient. According to an exemplary embodiment, an update log which is created for modifications or changes to the target shared file made by a folder participant may be reflected in real time in the file sharing chat room.

Here, a file update may refer to every change made to a file, including when a file is created, modified, changed, or edited, or when file access rights are changed. A file update log is a detailed record of changes to a file that are created when the file is updated.

That is, if the target shared file is modified by a third person, apart from the chat participants, including the folder participants in the shared folder, an update is made to the target shared file, which includes either modifications or changes or both of them. In this instance, the controller 330 may provide a new file object corresponding to the updated target shared file through the file sharing chat room. Here, the new file object may be provided to the chat room in the form of a chat message. That is, if the target shared file is modified by a third person, apart from the chat participants, the controller 330 may provide the modified target shared file to the chat participant terminals 120a and 120b through the file sharing chat room.

When the target shared file is updated, the controller 330 may keep a record of when the update was made through which user's terminal and what the update is about, and provide information about the file update—that is, information about the update log for the target shared file, who updated the file, the update time, and so forth.

Moreover, if no chat message is entered into the controller 330 for more than a certain amount of time, or the target shared file is not updated for more than a certain amount of time, the controller 330 may store in the memory 220 the file object of a final version of the target shared file which was updated most recently by a chat participant 120a or 120b. Also, the controller 330 may delete the file objects of previous versions of the target shared file in order of oldest to most recent. Alternatively, if the controller 330 chooses a file to delete first, the memory 220 may delete the file or move it to a separate storage space.

Moreover, if the target shared file is modified by a third person, apart from the chat participants, the controller 330 may provide the chat participant terminals 120a and 120b with an update log which is created for modifications or changes to the target shared file, through the file sharing chat room. In this instance, the controller 330 may provide a new file object for the modified target shared file or the update log in the form of a chat message in the file sharing chat room.

As exemplified previously, the third person, apart from the chat participant who updated the target shared file, may be at least part of the folder participants in the shared folder where the target shared file is originally located. Also, the file sharer may be at least one of the folder participants.

Here, the shared folder where the target shared file is originally located may be referred to as an original folder for convenience. In this case, there are differences in the access path to the target shared file or right to access the target shared file among the folder participants of the original folder, the file sharer, and the shared file recipient.

The target shared file is located in the shared folder, that is, the original folder, and one or more users including the file sharer participate as folder participants in the shared folder. In this case, the chat participants—that is, the file sharer and the shared file recipient, can access the target shared file through the file sharing chat room rendered on their terminal. Also, the folder participants can access the target shared file through the shared folder, that is, the original folder.

Accordingly, if the file sharer is a folder participant, the file sharer can access the target shared file through both the file sharing chat room and the shared folder. On the other hand, if the file sharer is not a folder participant, the file sharer is not allowed access to the shared folder, which is the original folder, and access to the target shared file through the shared folder. The file sharer can access the target shared file only through the file sharing chat room if they are not a folder participant, and the folder participants can access the target shared file only through the shared folder, i.e., original folder if they are not a chat participant.

If the file sharer is not a folder sharing member, i.e., folder participant, of the shared folder, i.e., original folder—for example, if the target shared file is a file shared to the file sharer from any other user, it may mean that the file sharer gets the target shared file, especially along with a private folder for file sharing, and has the right to reshare the target shared file.

When the private folder for file sharing is provided to the shared file recipient, the shared file recipient may access the target shared file through the file sharing chat room and the private folder for file sharing if the file share is not a folder participant of the shared folder, i.e., original folder.

The access path to the target shared file and the right to access the target shared file may be set differently among the chat participants, the folder participants of the original folder, the file sharer, and the shared file recipient.

The controller 330 may grant the chat participants the rights to read and/or modify the target shared file and grant the folder participants the rights to read, modify, and/or delete the target shared file. That is, if the shared file recipient gets the target shared file through the file sharing chat room, the shared file recipient may not be granted the right to delete the target shared file. That is, the folder participants of the original folder or the file sharer may determine whether to delete the target shared file shared through the file sharing chat room. Especially when the target shared file is deleted from the shared folder, i.e., original folder, the file sharing chat room and/or the target shared file provided through the file sharing chat room also may be deleted or disabled.

Moreover, if a new chat message is created and accumulated in the file sharing chat room, the controller 330 may send a notification about this to the chat participant terminals 120a and/or 120b. if there are one or more new updates to the chat messages or target shared file, the controller 330 may send a notification message to the chat participants 120a and/or 120b or folder participant terminals who have the right to access the target shared file. Alternatively, the notification message may be sent to the user terminal 120 through the network input/output part 240.

The folder manager 340 may provide a folder to the shared file recipient if necessary. The foregoing exemplary embodiment describes an example in which a file request signal is inputted from the shared file recipient terminal 120b. That is, as previously explained, the chat room-based file sharing device 110 sends the target shared file to the shared file recipient terminal 120b, and the target shared file is accessed and rendered through the chat room.

Contrariwise, the exemplary embodiment to be explained below describes an example in which the chat room-based file sharing device 110, particularly the folder manager 340, provides the shared file recipient with a private folder for file sharing and the shared file recipient terminal 120b accesses the target shared file through the private folder.

For example, in a case where the target shared file is provided to the shared file recipient terminal 120b through a folder, the folder manager 340 may create a private folder for file sharing dedicated to the shared file recipient and provide the shared file recipient 120b with the target shared file through the private folder.

That is, once the folder manager 340 creates a private folder for file sharing and provides it to the shared file recipient 120b, a target shared file may be included in the private folder, and the shared file recipient terminal 120b may gain access to the private folder and access the target shared file through the private folder. In this instance, the target shared file provided to the shared file recipient terminal 120b may be located in the private folder for file sharing.

Also, if the shared file recipient terminal 120b tries to re-access the private folder later, the folder manager 340 or the controller 330 check whether the shared file recipient 120b has the right to access to it. Only when the shared file recipient 120b is found to have the right to access the private folder, a list of target shared files which the shared file recipient terminal 120b has the right to access, among the target shared files in the private folder, may be provided.

Here, the folder manager 340 may obtain user information or terminal identification information associated with the shared file recipient terminal 120b and check the shared file recipient terminal 120b's access rights to the private folder for file sharing. The folder manager 340 may allow access only when the shared file recipient or the shared file recipient terminal 120b is found to have the right to access the private folder.

Here, the target shared file may be a file in the private folder the chat room-based file sharing device provides to the file sharer or a shared file in the shared folder in which the file sharer is participating as a folder participant together with other users. In this case, the controller 330 and/or the folder manager 340 may create a copy of the target shared file and store it in the private folder which is provided to the shared file recipient for file sharing purposes.

Moreover, as previously explained, the target shared file may be provided to the target recipient terminal 120b through the file sharing chat room, without the private folder for file sharing.

The shared file recipient's terminal who is provided with a private folder for file sharing purposes may access the target shared file through the private folder or through the file sharing chat room. However, other files shared to the shared file recipient through other chat rooms as well as through the file sharing chat room, too, may be located in the private folder. If no private folder for file sharing is provided, the access path may be restricted such that the shared file recipient terminal 120b can access the target shared file only through the file sharing chat room.

Here, the shared file recipient's rights to read and update the target shared file may be set out in advance. For example, the shared file recipient can read the target shared file but cannot modify it, or can both read and modify the target shared file. When the shared file recipient's terminal 120b accesses the target shared file, the target shared file may be opened, displayed on the shared file recipient terminal 120b, or updated in response to a user input from the shared file recipient terminal 120b, only when the shared file recipient is found to have the rights as set out in advance. It is needless to say that the target shared file can be opened through the aforementioned private folder or the file sharing chat room.

If the target shared file is modified or changed by the shared file recipient terminal 120b, an update log for the modifications or changes and a new, updated file object may be stored. In a case where the target shared file is provided through the private folder for file sharing, an update log and a new, updated file object may be stored in the private folder. Alternatively, in a case where the target shared file is provided through the chat room, an update log and a new, updated version of the file object may be recorded in the chat room. In this case, the update log and a new updated version of the file object may be sent through the chat room in the form of a chat message. Also, in the case of a file that is provided through the chat room and opened through a separate window dedicated to the chat room, an update log and a new, updated version of the file object may be stored in the memory 220 of the chat room-based file sharing device 110.

As explained previously, the target shared file shared through the file sharing chat room may be restricted from being stored in the memory in the chat participant terminals 120a and 120b. Their rights to read and update the target shared file are as set out in advance. Here, the shared file recipient's terminal 120b may update the target shared file opened through the file sharing chat room only when the shared file recipient is found to have the right to update or modify the target shared file.

In a case where the target shared file is provided as a chat message, the chat participants may update the target shared file through the file sharing chat room. Alternatively, in a case where the target shared file is provided through a separate window dedicated to or associated with the file sharing chat room, the chat participant may update the target shared file through this window. In this case, a new version of the target shared file updated by the chat participant and an update log for the target shared file may be recorded in the file sharing chat room or in the memory 220.

In a case where the target shared file is provided through the aforementioned private folder for file sharing, the chat participant may access the target shared file through the private folder and open and update the target shared file. In this case, a new version of the target shared file updated by the chat participant and an update log for the target shared file may be stored in the private folder or stored in the memory 220.

Besides, the processor 210 may further include a message manager 350. The message manager 350 may receive input signals from a chat participant terminal (file sharer terminal 120a and/or file recipient terminal 120b) and create chat messages.

Also, the message manager 350 may create a chat file object containing a message thread which will be displayed through a file chat room. The message thread may include chat messages, a target shared file provided in the form of a chat message, or an update log for the target shared file. The chat messages are typical chat messages that are entered by the chat participant terminals 120a and 120b through a chat window of the file sharing chat room. Text, images, voice, file objects, etc. may be entered as chat messages. Accordingly, the chat messages may be in the form of one or more among text, image, voice, or document.

The message manager 350 may create a chat message, including which chat participant has entered what message and when. To this end, identification information of the chat participant terminals (file sharer terminal 120a and/or file recipient terminal 120b) may be used.

As new chat messages are continuously inputted in real time from the chat participant terminals (file sharer terminal 120a and/or file recipient terminal 120b), the message manager 350 may create new chat messages, and the controller 330 may continue to update the file sharing chat room.

Figure 4:
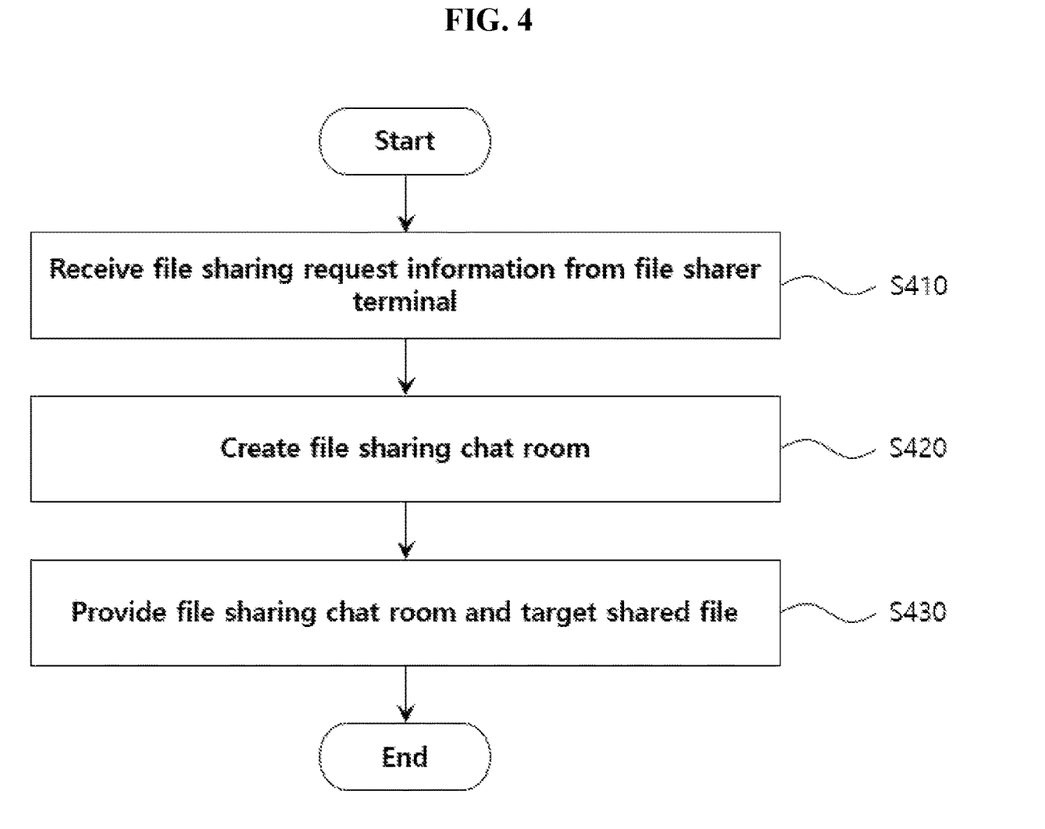
FIG. 4 is a flowchart showing a chat room-based file sharing method according to an exemplary embodiment of the present invention.

FIG. 4 is a flowchart showing a chat room-based file sharing method according to an exemplary embodiment of the present invention.

The chat room-based file sharing device 110 receives file sharing request information from the file sharer terminal 120a (S410). The file sharer terminal 120a is a terminal of a user who shares a particular file with any other user, i.e., a shared file recipient, through a chat room for file sharing, based on the right to share the file. The shared file recipient terminal 120b is a user with whom the file sharer terminal 120a chooses to share the file. The file sharer terminal 120a and the shared file recipient terminal 120b are user terminals connected either via wires or wirelessly to the chat room-based file sharing device, and may include one or more user terminals.

The file sharing request information sent by the file sharer terminal 120a includes information about the shared file recipient, which indicates with whom the file is shared, and information about the target shared file, which indicates which file is to be shared.

The chat room-based file sharing device 110 creates a file sharing chat room associated with the target shared file, as specified in the file sharing request information (S420). The chat room-based file sharing device 110 creates a file sharing chat room associated with the specified target shared file based on the file sharing request information. Then, the chat room-based file sharing device 110 specifies the chat participants in the file sharing chat room, including the file sharer and file recipient specified by the file sharing request information.

Also, the chat room-based file sharing device 110 may provide the file sharing chat room to the chat participant terminals 120a and 120b and provide the target shared file through the file sharing chat room (S430).

Here, the shared file recipient terminal 120b may be provided with the target shared file by entering a shared file request signal through the file sharing chat room. For example, when a chat room for file sharing is opened and the chat room is rendered and displayed on the shared file recipient terminal 120b, the shared file recipient then may enter a shared file request signal through the file sharing chat room on the shared file recipient terminal 120b. An area for entering a shared file request signal may be prepared on a user interface for the file sharing chat room. For example, if a button for entering a shared file request signal or the name of the chat room is clicked, the chat room-based file sharing device 110 may recognize this as a shared file request signal according to the presettings and send and provide the target shared file to the shared file recipient terminal 120b.

Here, "providing the target shared file" does not mean that the shared file recipient terminal 120b receives and downloads the target shared file and permanently stores it in a memory area of the shared file recipient terminal 120b. The target shared file may be provided to the shared file recipient terminal 120b and rendered and displayed on it, and may be modified, changed, or updated depending on how the shared file recipient's rights are set out. However, the target shared file is restricted from being permanently stored in the memory in the shared file recipient terminal 120b. This is for preventing the target shared file from being updated, owned, retransmitted, or distributed beyond the control of the file sharer. This makes the exemplary embodiment of the present invention different from the transmission and sharing of files via emails or typical messengers.

Accordingly, the target shared file may be sent in the form of a chat message in the file sharing chat room. In this case, if the file sharer modifies or changes the target shared file, this file update may occur in the chat window of the file sharing chat room. Also, an update log and a new, updated version of the target shared file may be recorded in the file sharing chat room and stored in the memory 220.

Alternatively, the target shared file may be displayed through a separate window dedicated to or associated with the file sharing chat room, and may be updated, including a modification, change, etc. Likewise, an update log and a new, updated version of the target shared file may be recorded in the file sharing chat room and stored in the memory 220.

Moreover, an access path to the target shared file may be indicated in the file sharing chat room. The access path to the target shared file may be indicated in the form of a chat message in the file sharing chat room, or may be always indicated in a certain area of the file sharing chat room.

Alternatively, the target shared file may be provided to the shared file recipient terminal 120b through a folder created for file sharing—or more particularly, a virtual private folder provided to the shared file recipient. To this end, the chat room-based file sharing device 110 may create a private folder dedicated to the shared file recipient for file sharing purposes. Also, the shared file recipient 120b may be given an access path to the private folder and the right to access it, and may be provided with the target shared file through the private folder. There are a number of methods for providing the target shared file through the private folder, including storing the access path to the target shared file in the private folder or storing a copy of the target shared file in the private folder. In this case, the private folder for file sharing may be a sort of cloud.

Figure 5:
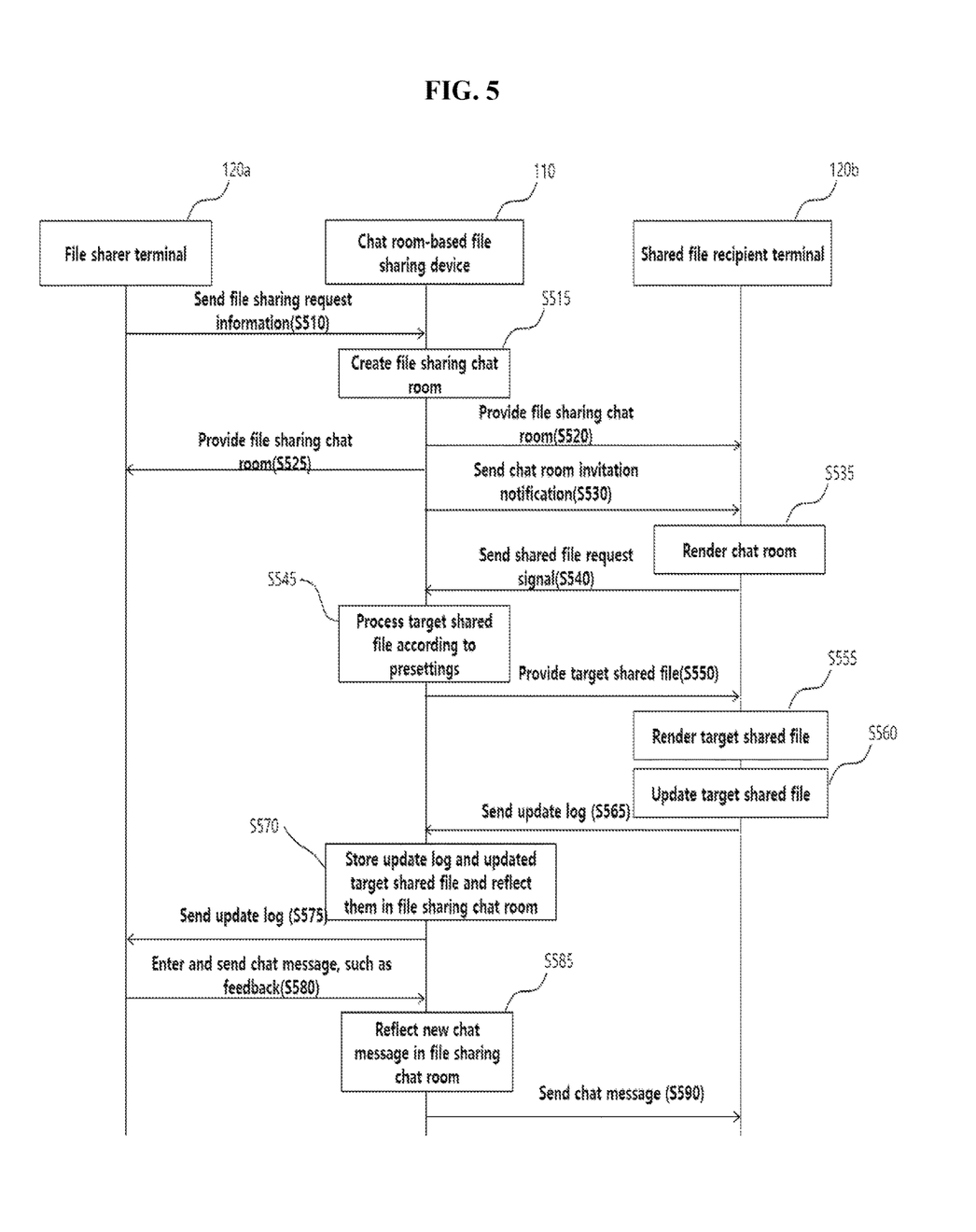
FIG. 5 is a flowchart showing a chat room-based file sharing method according to another exemplary embodiment of the present invention.

FIG. 5 is a flowchart showing a chat room-based file sharing method according to another exemplary embodiment of the present invention.

Referring to FIG. 5, in the chat room-based file sharing system 100, a signal flow between the chat room-based file sharing device 110 and the chat participant terminals 120a and 120b, i.e., the file sharer terminal 120a and the shared file recipient terminal 120b will be described.

Firstly, the file sharer terminal 120a sends file sharing request information to the chat room-based file sharing device 110 (S510). The file sharing request information may include identification information of the target shared file and identification information of the shared file recipient or file recipient terminal 120b.

The chat room-based file sharing device 110 creates a file sharing chat room file based on the file sharing request information (S515). The chat participants in the file sharing chat room are the file sharer and the shared file recipient. The file sharer and the shared file recipient each may include at least one user, and one user may connect using one or more terminals.

The chat room-based file sharing device 110 provides the created file sharing chat room to the file sharer terminal 120a and the shared file recipient terminal 120b (S520 and S525). The chat room-based file sharing device 110 may send a notification signal to the shared file recipient terminal 120b, indicating that the shared file recipient terminal 120b has a file shared through the file sharing chat room and an invitation to the chat room (S530).

The file sharing chat room may be rendered on the shared file recipient terminal 120b (S535). After accepting the invitation to the file sharing chat room and running the file sharing chat room on the shared file recipient terminal 120b, the shared file recipient may send a shared file request signal to the chat room-based file sharing device 110 in order to check out the target shared file (S540). For example, the shared file recipient may enter a shared file request signal by clicking on the name of the file sharing chat room rendered on the shared file recipient terminal 120b or a specific area in the chat window.

Upon receiving a shared file request signal requesting to provide the shared file, the chat room-based file sharing device 110 may process the target shared file according to presettings (S545). That is, according to an exemplary embodiment, in a case where the target shared file is set to be provided as a chat message, the chat room-based file sharing device may provide the target shared file as a chat message and insert the target shared file provided in the form of a chat message into the message thread to update the chat file object.

Alternatively, according to another exemplary embodiment, in a case where the target shared file is sent as it is through the chat room, the target shared file may be processed, such as compressed in a transmittable form. However, in the processing process, the shared file recipient's rights to the target shared file may be restricted. For example, the target shared file may be set in such a way as not to be permanently stored in the shared file recipient terminal 120b. Also, the target shared file may be readable but cannot be modified. The shared file recipient's rights to store, delete, read, and modify the file may be set to vary. The target shared file may be set to be displayed through a separate window that is dedicated to or associated with the file sharing chat room and specified in advance.

The chat room-based file sharing device 110 sends and provides the processed target shared file to the shared file recipient terminal 120b according to the presettings (S550).

Afterwards, the target shared file may be rendered on the shared file recipient terminal 120b (S555). For example, the file sharing chat room may be displayed through a display part of the shared file recipient terminal 120b. If the shared file recipient has the right to modify the target shared file, the target shared file may be modified on the shared file recipient terminal 120b (S560).

Then, an update log for the target shared file may be sent to the chat room-based file sharing device 110 (S565). In this instance, a new, updated version of the target shared file, along with the update log, may be sent to the chat room-based file sharing device 110.

The chat room-based file sharing device 110 may store in the memory 220 an update log created by the shared file recipient terminal 120b and a new version of the target shared file corresponding to the update log and reflect them in the file sharing chat room (S570). That is, an update log and/or a new, updated version of the target shared file may be provided in the form of a chat message, or may be provided in such a way as to be downloaded or read through the file sharing chat room.

Accordingly, the file sharer terminal 120a may receive the update log for the target shared file created by the shared file recipient and/or a new, updated version of the target shared file and check what this update is about (S575). Upon finding an update of the target shared file, the file sharer may give feedback by entering a chat message about it and sending it to the chat room-based file sharing device 110 (S580). The chat room-based file sharing device updates the chat file object by adding a new chat message received from the file sharer terminal 120a to the message thread and reflect the new chat message in the file sharing chat room (S585). The new chat message may be then sent to the shared file recipient terminal 120b (S590).

Figure 6:
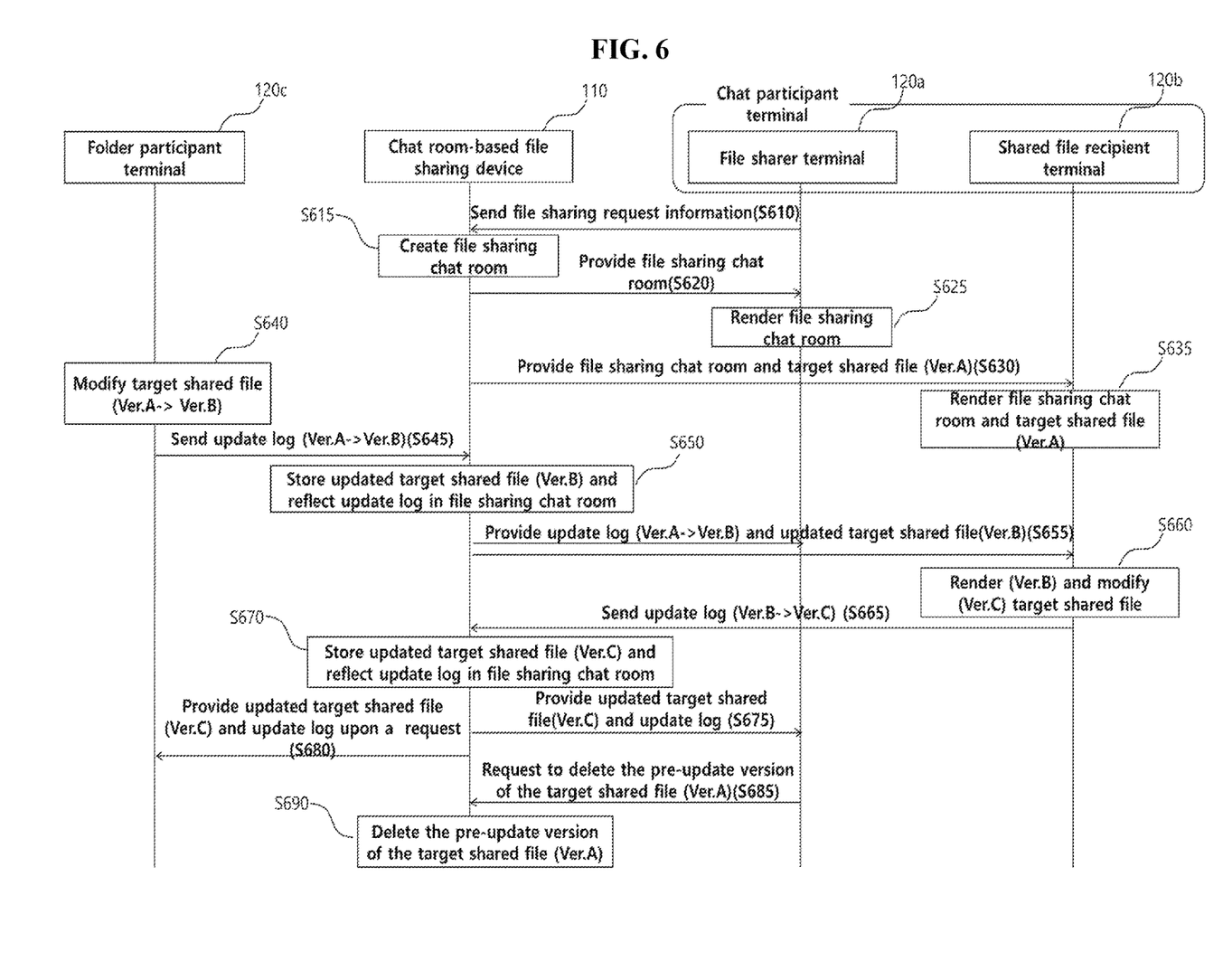
FIG. 6 is a flowchart showing a chat room-based file sharing method according to yet another exemplary embodiment of the present invention.

FIG. 6 is a flowchart showing a chat room-based file sharing method according to yet another exemplary embodiment of the present invention.

Referring to FIG. 6, a signal flow among the chat room-based file sharing device 110, the chat participant terminals 120a and 120b (the file sharer terminal 120a and the shared file recipient terminal 120b), and other terminals having the right to access the target shared file will be described.

In FIG. 6, terminals having the right to access the target shared file, other than the chat participant terminals 120a and 120b, are illustrated as folder participant terminals 120c who have the rights to access the shared folder containing the target shared file and the files in the shared folder. That is, a folder participant is a folder sharing member of the shared folder, i.e., original folder containing the target shared file but is not a chat participant of the file sharing chat room according to the exemplary embodiment of the present invention.

First of all, the file sharer terminal 120a sends file sharing request information to the chat room-based file sharing device 110 (S610). Thus, the chat room-based file sharing device 110 creates a file sharing chat room (S615). Next, the chat room-based file sharing device 110 may provide the file sharing chat room to the file sharer terminal 120a (S620), and the file sharer terminal 120a may render the file sharing chat room (S625).

The chat room-based file sharing device 110 may likewise provide the file sharing chat room to the shared file recipient terminal 120b. Also, it may provide a target shared file through the file sharing chat room (S630). The target shared file sent is a file that has not been updated by a user, and may be referred to as a target shared file of version A (Ver.A) for convenience. Accordingly, the shared file recipient terminal 120b may render the target shared file of version A (Ver.A) (S635).

As explained before, other users, as well as the file sharer, may have the rights to access and modify the target shared file, for example, especially when the original folder where the target shared file is originally located is a shared folder in which two or more users are participating. Hence, a folder participant terminal 120c of the shared folder, i.e., original folder may be a typical example of a user terminal who is not a chat participant but has the rights to access and modify the target shared file.

In the exemplary embodiment described with reference to FIG. 6, the folder participant terminal 120c may access and update the target shared file through the shared folder, i.e., original folder. Also, an update log created by the folder participant terminal 120c outside the file sharing chat room may be reflected in real time in the file sharing chat room.

In another exemplary embodiment, the original folder where the target shared file is originally located may be a private folder of the file sharer. Even when the file sharer terminal 120a, one of the chat participant terminals 120a and 120b, accesses and updates the target shared file, not through the file sharing chat room but through the shared folder, an update log and a new, updated version of the target shared file may be reflected in real time in the file sharing chat room.

The folder participant terminal 120c may access the target shared file through the shared folder, i.e., original folder, and modify the target shared file from version A (Ver.A) to version B (Ver.B) (S640). When the target shared file is stored after modified, the target shared file of version B (Ver.B) is sent to the chat room-based file sharing device 110 (S645).

The updated target shared file of version B (Ver.B) may be stored in the memory 220, and an update log for the target shared file from version A to version B may be reflected in the file sharing chat room (S650). Accordingly, the update log and the updated target shared file of version B may be recorded in the form of a chat message in the file sharing chat room, or may be provided to the chat participant terminals 120a and 120b through the file sharing chat room in a downloadable or readable form (S655).

After checking out the updated target shared file of version B, the shared file recipient may re-modify the target shared file (S660). In this case, needless to say, it should be assumed that the shared file recipient or file recipient terminal 120b has the right to modify the target shared file. First, the target shared file of version B is rendered on the file sharer terminal 120a and the shared file recipient terminal 120b, and the target shared file of version B may be modified on the shared file recipient terminal 120b and updated into version C (S660).

Accordingly, a second update log for the target shared file from version B to version C may be sent to the chat room-based file sharing device 110 from the shared file recipient terminal 120b (S665). A new, updated version, i.e., version C, of the target shared file may be sent along with the update log.

The chat room-based file sharing device 110 may store the updated target shared file of version C and the update log from version B to version C, received from the shared file recipient terminal 120b, in the memory 220, and reflect them in the file sharing chat room (S670). The update log and the updated target shared file of version C may be provided to the file sharer terminal 120a through the chat room in the form of a chat message or in the form of a downloadable or readable file (S675).

Moreover, since the updated target shared file of version C and the update log from version B to version C are stored in the memory 220 and reflected in the shared folder, i.e., original folder, the folder participant terminal 120c may be provided with the updated target shared file of version C and the update log from version B to version C by sending a request (S680).

As the target shared file is updated, the file sharer terminal 120a may request the chat room-based file sharing device 110 to delete the oldest version, i.e., version A, of the target share file (S685). Needless to say, in other exemplary embodiments, if a preset condition is met, such as when a certain amount of time has passed or when a certain number of new, updated versions of the target shared file are accumulated, the controller 330 may delete older versions of the target shared file stored in the memory 220.

Upon a deletion request from the file sharer terminal 120a, the chat room-based file sharing device 110 may delete the target shared file of version A stored in the memory 220. However, as long as the shared target files of version B and version C are left but not version A, the file sharing chat room according to the exemplary embodiment of the present invention may be maintained without being ended or disabled. If the target shared files of all versions are deleted by a user having the right to delete it, the file sharing chat room may be ended or disabled.

Figure 7:
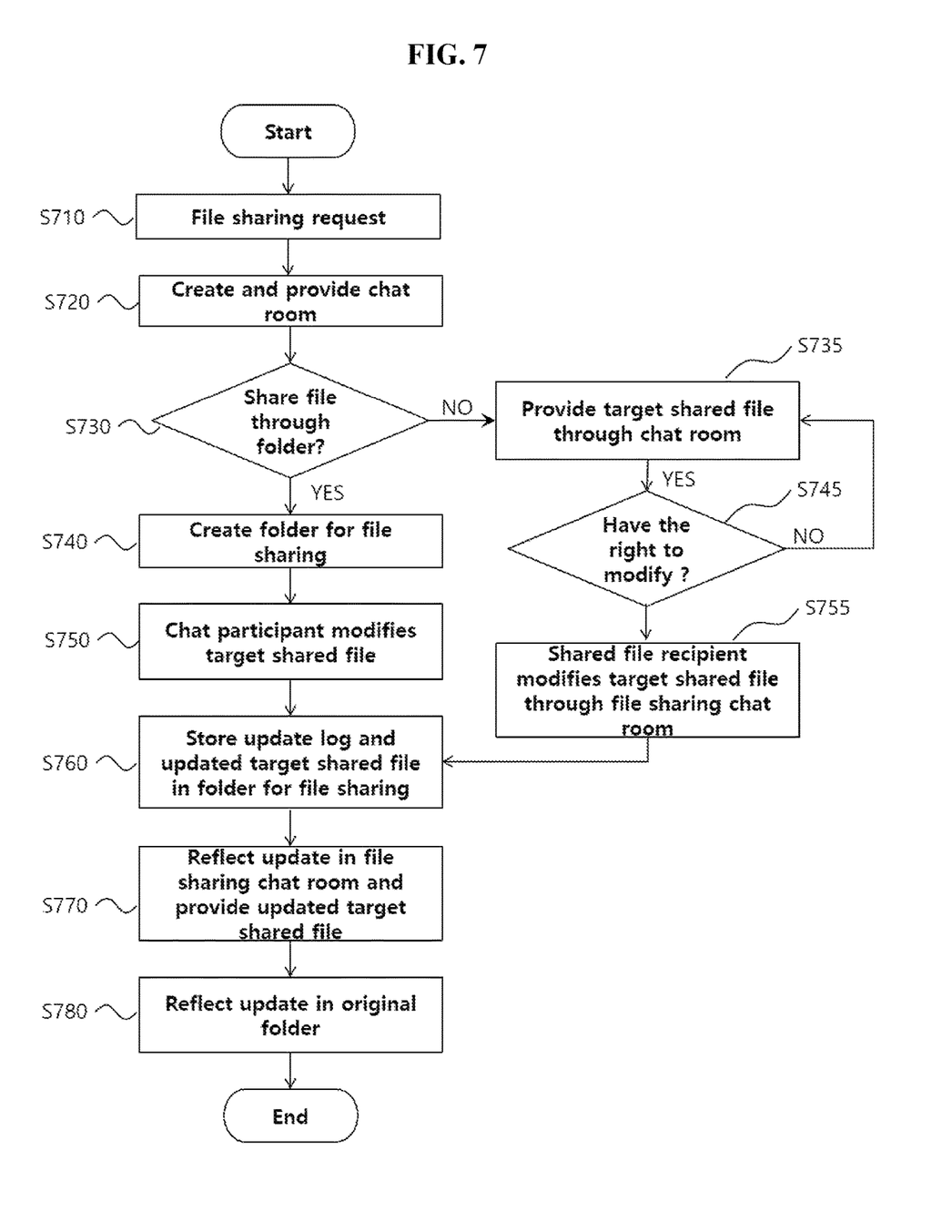
FIG. 7 is a flowchart showing a chat room-based file sharing method according to a further exemplary embodiment of the present invention.

FIG. 7 is a flowchart showing a chat room-based file sharing method according to a further exemplary embodiment of the present invention.

In the exemplary embodiment described with reference to FIG. 7, the chat room-based file sharing device 110 may create a folder for file sharing with a shared file recipient terminal 120b and provide a target shared file to the shared file recipient terminal 120b through this folder. Here, the folder for file sharing may be a folder associated with a chat room.

The chat room-based file sharing device 110 receives a file sharing request from a file sharer terminal 120a (S710). Transmission of file sharing request information is an example of a file sharing request. The chat room-based file sharing device 110 may create a file sharing chat room in response to a request and provide a file sharing chat room to the chat participants 120a and 120b (S720).

The chat room-based file sharing device 110 determines whether to share the target shared file through the folder for file sharing (S730). When providing the target shared file through the folder for file sharing, the chat room-based file sharing device 110 may create a folder first (S740). The folder may be a private folder of the shared file recipient 120b or a shared folder in which the chat participant terminals 120a and 120b are participating together.

Here, the shared file recipient terminal 120b may access, read, and modify the target shared file through the folder for file sharing (S740). In this case, the chat participant terminal, including the shared file recipient terminal 120b, also may access and modify the target shared file through a file sharing chat room and through the folder (S750).

In a case where the folder for file sharing is created as a shared folder in which the chat participants participate, the file sharer, as well as the shared file recipient, may access, read, and modify the target shared file through the folder.

If the shared file recipient terminal 120b accesses and modifies the target shared file through the folder for file sharing, an update log and an updated, new version of the target shared file may be stored in the folder (S760).

Unless the chat room-based file sharing device 110 shares the file through a file sharing chat room, the chat room-based file sharing device 110 does not need to create a folder but may provide the target shared file to the shared file recipient terminal 120b through the file sharing chat room. The target shared file may be accessed and read by the shared file recipient through the chat room (S735).

If the shared file recipient wants to modify the target shared file, it is determined whether the shared file recipient or file recipient terminal 120b has the right to modify or update the target shared file (S745). If the result shows that the shared file recipient or file recipient terminal 120b has no right to modify the target shared file, the chat room-based file sharing device 110 only allows for reading the target shared file (S735).

If the shared file recipient has the right to modify the file, the shared file recipient may read and modify the target shared file through the file sharing chat room (S755).

The target shared file modified, changed, or updated through the above-mentioned process may be stored in the file sharing folder or memory 220, along with an update log (S760). Also, the chat room-based file sharing device 110 may reflect the update of the target shared file in the file sharing chat room and provide the update log and/or the updated target shared file to the chat participant terminals 120a and 120b (S770).

Moreover, the update of the target shared file also may be reflected in the original folder where the target shared file is originally located (S780), whereby the updated target shared file may be stored in the original folder as well. Accordingly, even a user who is not a chat participant may check out an update log created by a chat participant and an updated version of the target shared file as long as the user has the rights to access and read the target shared file.

The disclosed technology may have the following effects. However, since it does not represent that a specific embodiment should include all the following effects or should include only the following effects, it should not be understood that the scope of the disclosed technology is limited thereby.

According to an exemplary embodiment of the present invention, there are provided a file sharing means and a means of communication between file sharers can be used when performing a task by sharing a file associated with the task, while restricting the rights to the file.

According to an exemplary embodiment of the present invention, there is provided a task management technology that provides a specific file to other users through a chat room, while keeping other users' access to the file under control of the user who provides the file, and continuously follows up on file modifications or task progress through the chat room after the file is provided.

Although preferred exemplary embodiments of the present invention have been described above, those skilled in the art will understand that the present invention may be variously modified and changed without departing from the spirit and scope of the present invention described in the following claims.

What is claimed is:

1. A chat room-based file sharing device comprising:
a memory; and
a processor electrically connected to the memory,
wherein the processor
receives file sharing request information including information about a target shared file and a shared file recipient,
extracts, from the received file sharing request information, identification information of the target shared file and identification information of the shared file recipient or a terminal of the shared file recipient,
creates, based on the extracted identification information of the target shared file and the identification information of the shared file recipient or the shared file recipient's terminal, a file sharing chat room associated with the target shared file that is specified by the file sharing request information, and
provides, based on the file sharing chat room being rendered on the shared file recipient's terminal, a file object corresponding to the target shared file to the shared file recipient's terminal through the file sharing chat room by displaying the target shared file through a window dedicated to the file sharing chat room,
wherein a file sharer and the shared file recipient share the target shared file through the file sharing chat room by participating as chat participants in the file sharing chat room,
wherein the target shared file provided in the shared file recipient's terminal is stored in the memory, accessible by the shared file recipient's terminal, and restricted from being stored in a memory in the shared file recipient's terminal, and
wherein the target shared file displayed through the window dedicated to the file sharing chat room is disabled and the target shared file is restricted from being shared by the file sharer recipient based on the file sharing chat room being disabled.

2. The chat room-based file sharing device of claim 1, wherein, when the file sharing chat room is rendered on the shared file recipient's terminal and a shared file request signal is received from the shared file recipient's terminal through the file sharing chat room, the processor provides a file object corresponding to the target shared file to the shared file recipient's terminal.

3. The chat room-based file sharing device of claim 1, wherein, when the file sharing chat room is rendered on the shared file recipient's terminal, the processor provides a file object corresponding to the target shared file through the file sharing chat room in a form of a chat message in the file sharing chat room.

4. The chat room-based file sharing device of claim 1, wherein, when the file sharing chat room is rendered on the shared file recipient's terminal, the processor provides an access path to the target shared file through the file sharing chat room in a form of a chat message in the file sharing chat room.

5. The chat room-based file sharing device of claim 1, wherein, if an update is made to the target shared file, including either modifications or changes or both, the processor provides a new file object corresponding to the updated target shared file in real time through the file sharing chat room in a form of a chat message.

6. The chat room-based file sharing device of claim 5, wherein the target shared file is located in a shared folder, and one or more users including the file sharer participate as folder participants in the shared folder, and
wherein the target shared file is updated by any one of the folder participants who has accessed the target shared file through the shared folder.

7. The chat room-based file sharing device of claim 1, wherein, if an update is made to the target shared file, including either modifications or changes or both, the processor provides an update log for the target shared file in real time in a form of a chat message.

8. The chat room-based file sharing device of claim 1, wherein the processor provides the shared file recipient with a private folder which the shared file recipient has a right to access, and provides a file object corresponding to the target shared file through the private folder, and
wherein the shared file recipient's terminal accesses the target shared file through either the private folder or the file sharing chat room or both.

9. The chat room-based file sharing device of claim 8, wherein the target shared file is opened through either the private folder or the file sharing chat room or both and updated through the shared file recipient's terminal, only when the shared file recipient is found to have rights to read and update the target shared file as set out in advance.

10. The chat room-based file sharing device of claim 8, wherein at least one between the target shared file updated by the shared file recipient's terminal and an update log for the target shared file is stored in at least one between the private folder and the memory.

11. The chat room-based file sharing device of claim 1, wherein the shared file recipient's terminal accesses the target shared file only through the file sharing chat room.

12. The chat room-based file sharing device of claim 11, wherein the target shared file opened through the file sharing chat room is updated through the shared file recipient's terminal, only when the shared file recipient is found to have rights to read and update the target shared file as set out in advance.

13. The chat room-based file sharing device of claim 11, wherein at least one between the target shared file updated through the file sharing chat room by the shared file recipient's terminal and an update log for the target shared file is stored in the memory.

14. The chat room-based file sharing device of claim 1, wherein the target shared file is located in a shared folder, and one or more users including the file sharer participate as folder participants in the shared folder, and wherein the chat participants access the target shared file through the file sharing chat room, and the folder participants access the target shared file through the shared folder.

15. The chat room-based file sharing device of claim 14, wherein the processor grants the chat participants rights to read and/or modify the target shared file and grants the folder participants the rights to read, modify, and/or delete the target shared file.

16. The chat room-based file sharing device of claim 1, wherein, if the target shared file is deleted by the file sharer, the processor deletes the file object, too, which is provided in a form of a chat message through the file sharing chat room.

17. The chat room-based file sharing device of claim 1, wherein, if the target shared file is deleted by the file sharer, the processor deletes the file sharing chat room.

18. The chat room-based file sharing device of claim 1, wherein the target shared file provided in the shared file recipient's terminal is restricted from being temporarily stored in the memory in the shared file recipient's terminal.

19. The chat room-based file sharing device of claim 1, wherein the target shared file is disabled in the shared file recipient's terminal based on an end to the rendering of the file sharing chat room.

20. The chat room-based file sharing device of claim 1, wherein the target shared file provided in the shared file recipient's terminal is accessible by the shared file recipient's terminal based on access rights to the target shared file being obtained by the shared file recipient's terminal, the access rights to the target shared filed being obtained by the shared file recipient's terminal based on the shared file recipient obtaining the target shared file shared through the file sharing chat room.

21. A chat room-based file sharing method that is performed by a chat room-based file sharing device comprising a memory and a processor electrically connected to the memory, the method comprising:

receiving file sharing request information including information about a target shared file and a shared file recipient;

extracting, from the received file sharing request information, identification information of the target shared file and identification information of the shared file recipient or a terminal of the shared file recipient;

creating, based on the extracted identification information of the target shared file and the identification information of the shared file recipient or the shared file recipient's terminal, a file sharing chat room associated with the target shared file that is specified by the file sharing request information; and providing, based on the file sharing chat room being rendered on the shared file recipient's terminal, a file object corresponding to the target shared file to the shared file recipient's terminal through the file sharing chat room by displaying the target shared file through a window dedicated to the file sharing chatroom, wherein a file sharer and the shared file recipient share the target shared file through the file sharing chat room by participating as chat participants in the file sharing chat room, wherein the target shared file provided in the shared file recipient's terminal is stored in the memory, accessible by the shared file recipient's terminal, and restricted from being stored in a memory in the shared file recipient's terminal, and wherein the target shared file displayed through the window dedicated to the file sharing chat room is disabled and the target shared file is restricted from being shared by the file sharer recipient based on the file sharing chat room being disabled.

22. A non-transitory recording medium storing a computer program for a computer-executable chat room-based file sharing method that is performed by a chat room-based file sharing device comprising a memory and a processor electrically connected to the memory, the method comprising:

receiving file sharing request information including information about a target shared file and a shared file recipient;

extracting, from the received file sharing request information, identification information of the target shared file and identification information of the shared file recipient or a terminal of the shared file recipient;

creating, based on the extracted identification information of the target shared file and the identification information of the shared file recipient or the shared file recipient's terminal, a file sharing chat room associated with the target shared file that is specified by the file sharing request information; and providing, based on the file sharing chat room being rendered on the shared file recipient's terminal, a file object corresponding to the target shared file to the shared file recipient's terminal through the file sharing chat room by displaying the target shared file through a window dedicated to the file sharing chatroom, wherein a file sharer and the shared file recipient share the target shared file through the file sharing chat room by participating as chat participants in the file sharing chat room, wherein the target shared file provided in the shared file recipient's terminal is stored in the memory, accessible by the shared file recipient's terminal, and restricted from being stored in a memory in the shared file recipient's terminal, and wherein the target shared file displayed through the window dedicated to the file sharing chat room is disabled and the target shared file is restricted from being shared by the file sharer recipient based on the file sharing chat room being disabled.

* * * * *